(12) United States Patent
Ferens et al.

(10) Patent No.: US 6,650,557 B2
(45) Date of Patent: Nov. 18, 2003

(54) 18-PULSE RECTIFICATION SYSTEM USING A WYE-CONNECTED AUTOTRANSFORMER

(75) Inventors: Jerzy Ferens, Bolton (CA); Henry D. Hajdinjak, Mississauga (CA); Sean Rhodes, Waterdown (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/061,987

(22) Filed: Feb. 1, 2002

(65) Prior Publication Data

US 2002/0190697 A1 Dec. 19, 2002

Related U.S. Application Data

(60) Provisional application No. 60/287,052, filed on Apr. 27, 2001.

(51) Int. Cl.[7] .......................... H02M 7/06; H02M 7/155
(52) U.S. Cl. .......................... 363/126; 363/129; 363/65
(58) Field of Search ........................ 323/215, 223, 323/119; 363/5, 39, 48, 70, 65, 125, 126, 128, 129, 69

(56) References Cited

U.S. PATENT DOCUMENTS

| | | | | |
|---|---|---|---|---|
| 3,975,673 A | * | 8/1976 | Boshnyaga et al. | 323/119 |
| 4,013,942 A | | 3/1977 | Boshnyaga et al. | |
| 4,876,634 A | * | 10/1989 | Paice | 363/126 |
| 5,050,058 A | * | 9/1991 | April et al. | 363/65 |
| 5,124,904 A | * | 6/1992 | Paice | 363/70 |
| 5,148,357 A | | 9/1992 | Paice | |
| 5,455,759 A | * | 10/1995 | Paice | 363/126 |
| 6,101,113 A | | 8/2000 | Paice | |
| 6,118,362 A | | 9/2000 | Tinkler et al. | |
| 6,191,968 B1 | * | 2/2001 | Paice | 363/48 |
| 6,198,647 B1 | | 3/2001 | Zhou et al. | |
| 6,249,443 B1 | * | 6/2001 | Zhou et al. | 363/5 |

OTHER PUBLICATIONS

Paice, D.A., "Power Electronic Converter Harmonics: Multipulse Methods for Clean Power," Piscataway, NJ: IEEE Press, c1996, p. 60 No Date.

* cited by examiner

*Primary Examiner*—Rajnikant B. Patel
(74) *Attorney, Agent, or Firm*—Larry J. Palguta

(57) ABSTRACT

An electrical AC-DC power conversion system featuring 18-pulse rectification and utilizing a low weight wye-connected phase shifting autotransformer (500) supplied from a 3-phase AC source (40) through a 3-phase line reactor (41). The current harmonic distortion is less that 5% and can be further reduced to 3% level by the use of additional suppression devices (eg., chokes) which are often required in aerospace applications. The transformer (500) includes three sections (501) each spaced 120° electrically apart, wherein each section (501) includes a main winding (510) and a pair of phase shift windings (540). The main winding (510) has a neutral end connected to a floating neutral point (502) and a source end (514) is connected to one phase (1, 2, 3) of the three-phase power source (40). The pair of phase shift windings (540) each include a second winding (520) and a third winding (530) connected in series and arranged to generate phase outputs (4–9) of the autotransformer (500). The above-described design results in a low weight/power configuration.

19 Claims, 9 Drawing Sheets

Basic "Wing" Configuration of the Optimized Autotransformer

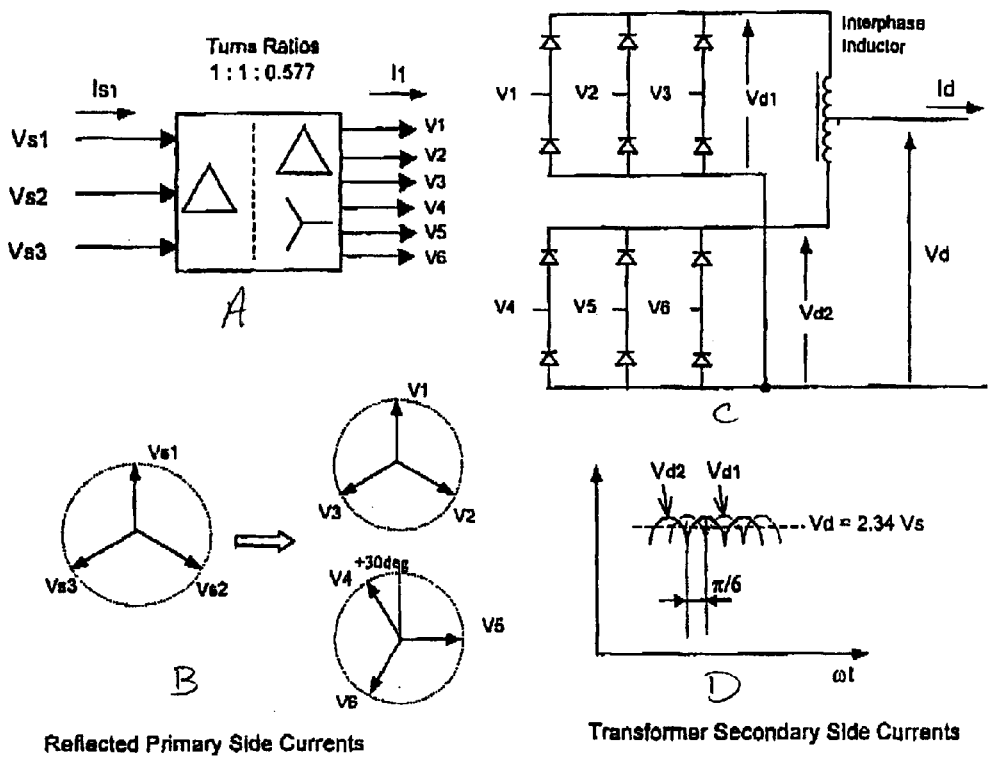
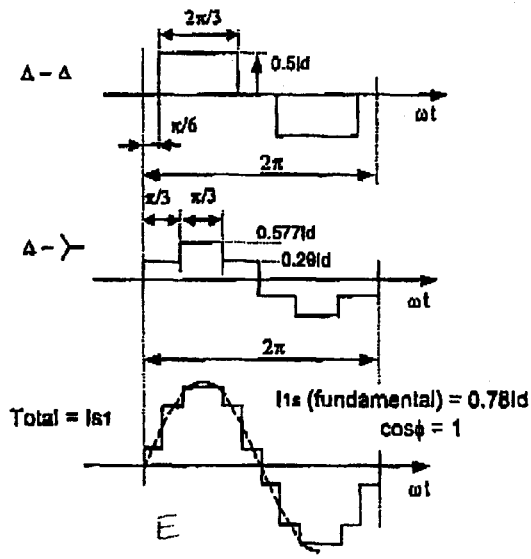
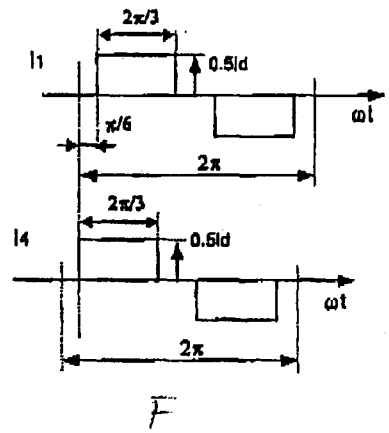
FIG. 1

FIG. 2 Typical Waveforms of a 12-pulse Circuit With Two 6-pulse Bridges and Interphase Inductor.
    $21$ - Supply Voltage, 100V/div.
    $22$ - Supply Current, 50A/div.
       Time Axis: 0.5ms/div.

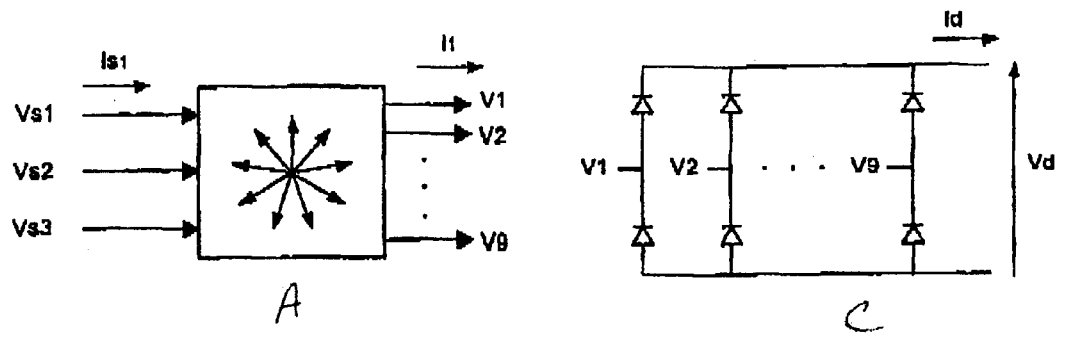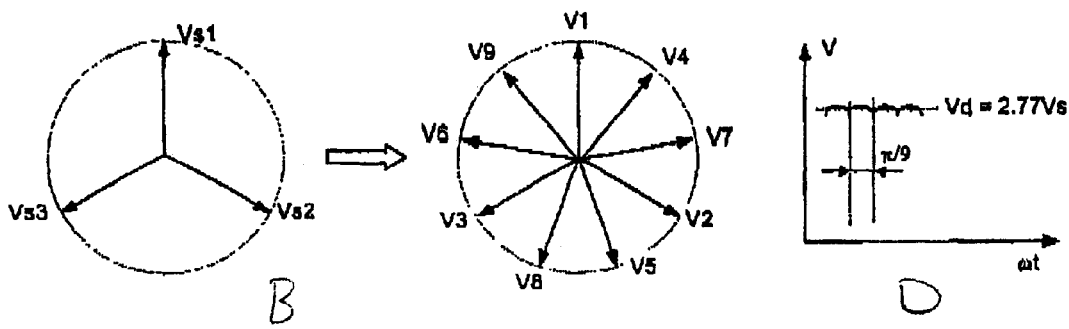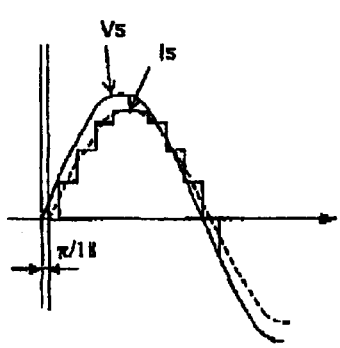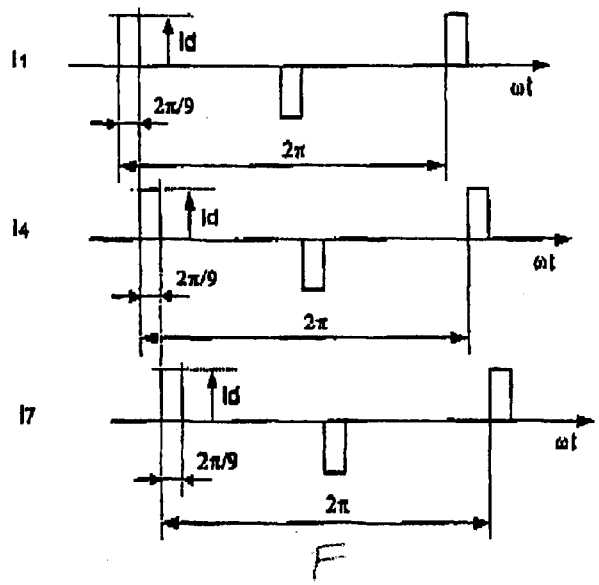
FIG. 3

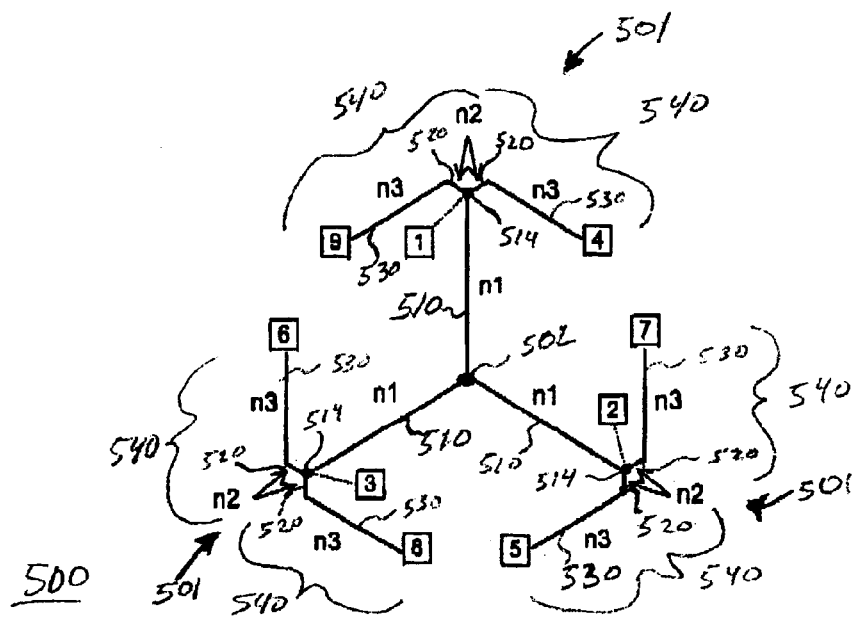
Fig.5A. Basic "Wing" Configuration of the Optimized Autotransformer
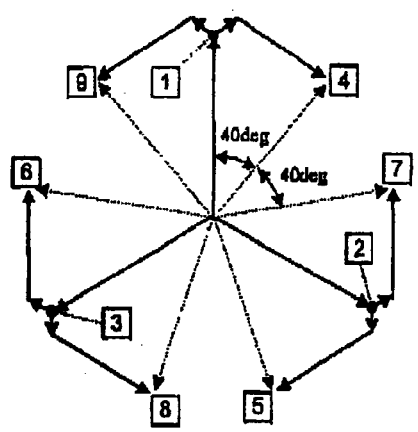
Fig.5B. Phasor Diagram of the Optimized Autotransformer

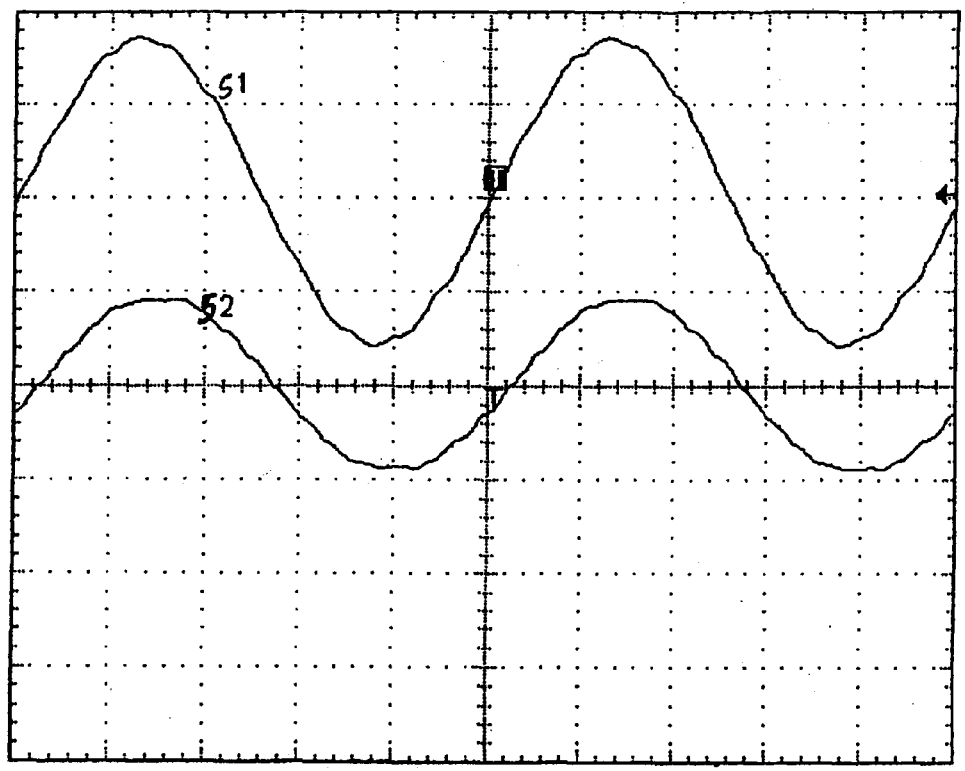
FIG. 5C Waveforms of the Optimized 18-pulse Front End.
AC Source: 115/200V, 400Hz
Total Current Harmonic Distortion = 3.2%
1 – Supply Voltage, 100V/div.
2 – Supply Current, 50A/div.
Time Axis: 0.5ms/div.

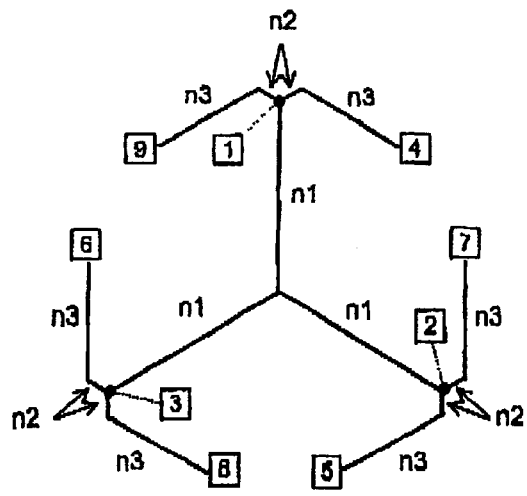
Basic "Wing"
A
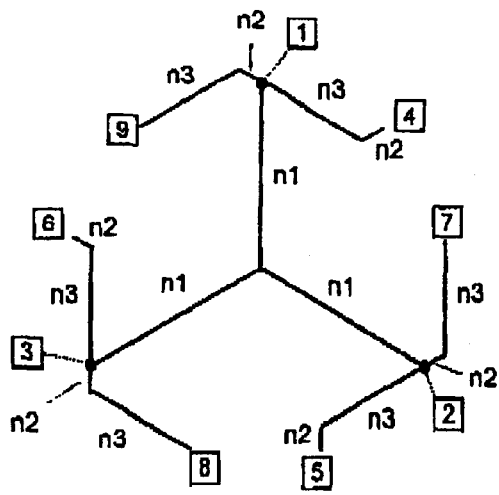 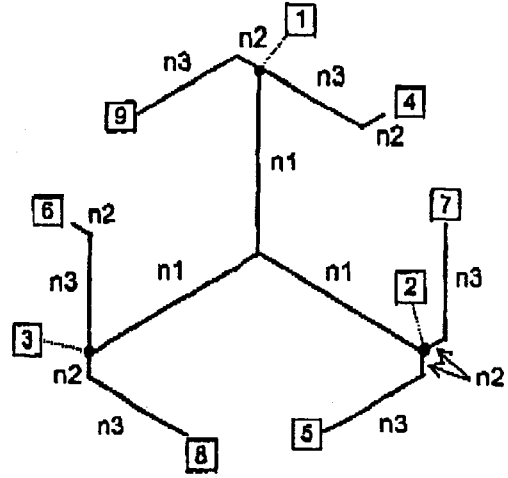
Asymmetrical                Mixed
B                           C
Fig.6. Configuration of the Basic and Variant Autotransformers for 18-pulse Rectification

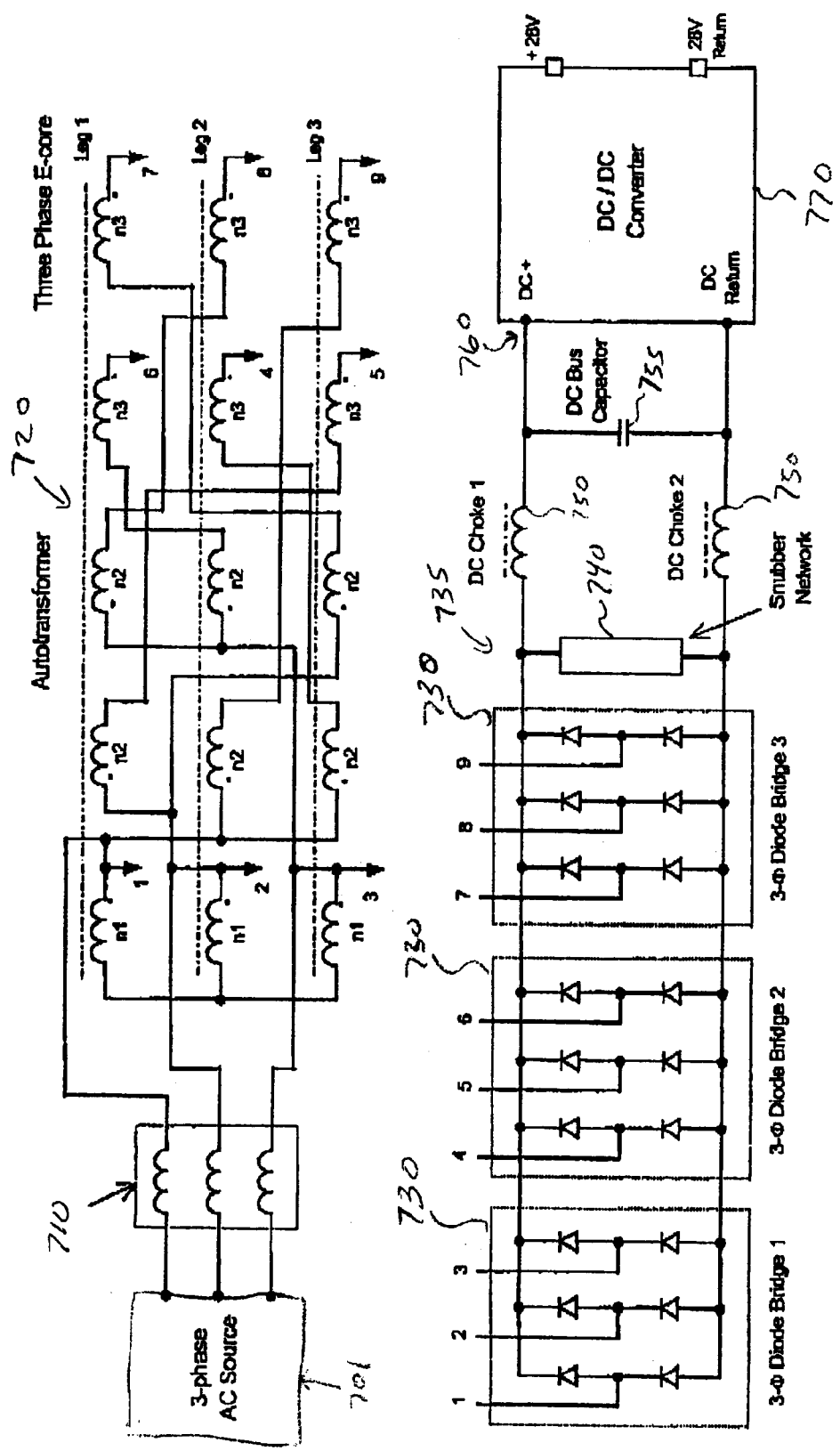
Fig.7. Regulated TRU with the Optimized 18-pulse Front End.

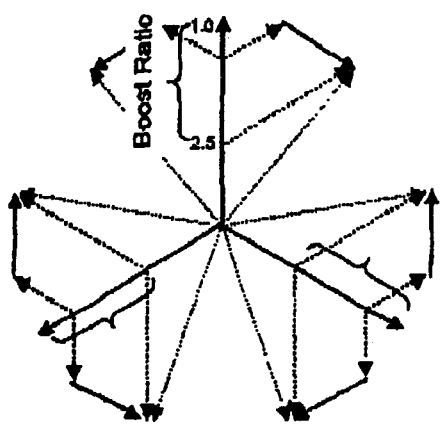
Fig.8A. Optimized Wye-connected Boosting Connections
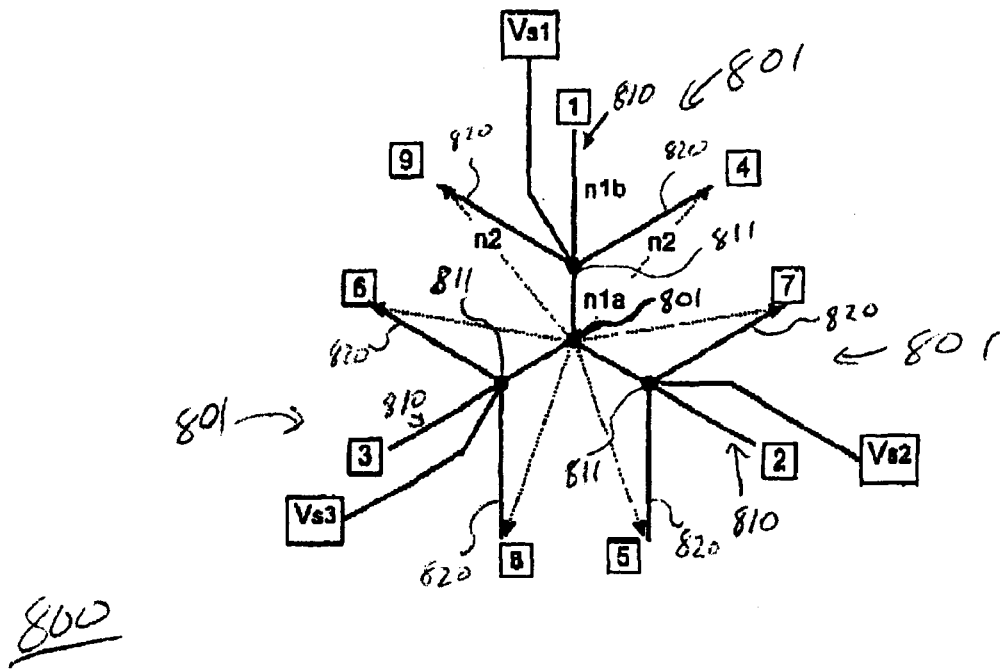
Fig.8B. Optimized Connections for the Boosting Ratio of 2.5.
n1a : n1b : n2 = 0.4 : 0.6 : 0.74

US 6,650,557 B2

18-PULSE RECTIFICATION SYSTEM USING A WYE-CONNECTED AUTOTRANSFORMER

RELATED APPLICATION

This application claims priority under 35 U.S.C. §119(e) of U.S. Provisional Application No. 60/287,052 filed on Apr. 27, 2001, the entire contents of which are herein incorporated by reference.

BACKGROUND OF THE INVENTION

1. Field of the Invention

This invention relates to an electrical power system. In particular, the invention addresses the level of harmonic distortions in electric power systems over a wide frequency range by the use of an 18-pulse DC supply.

2. Background

Many loads connected to AC distribution networks convert AC power into DC power. In order to reduce the harmonic currents generated by the conversion process a number of conventional techniques have been employed, such as passive filtering combined with 6-pulse rectification, active rectification, phase multiplication and the like. The phase multiplication method often used in aircraft and industrial electrical systems is known for its ruggedness and high reliability.

The main element of the phase multiplication method is a multi-phase transformer, supplied from a three-phase source and generating a multiphase AC supply for conversion into DC power, as exemplified in FIGS. 1A–F. FIG. 1A illustrates a block diagram of a conventional multiphase transformer having primary and secondary windings. A 3-phase AC source supplies the primary windings Vs1–Vs3. The primary is connected in a delta configuration and the secondary of the transformer includes both delta and wye connected windings that generate the appropriate phase shift and voltage for the 6-phase output V1–V6. FIG. 1B illustrates a phasor diagram of the respective winding. FIG. 1C illustrates a full wave rectification circuit that converts the 6-phase output of the secondary to a 12-pulse DC voltage. In the scheme of FIG. 1C, an interphase inductor is placed between the 6-pulse rectifying bridges in order to suppress cross-commutation between the bridges. The interphase inductor can be omitted in cases where the two 6-pulse rectifying bridges are supplied from two isolated sources. FIG. 1D illustrates the resulting waveform by superimposing Vd1 and Vd2. The resulting waveform has a period of π/6 and therefore results in a lower ripple voltage and current on the DC side. Multiphase rectification can be analyzed by superposing the effects of multiple 6-pulse rectification circuits supplied from multiple, phase-shifted, 3-phase sources, as shown in FIGS. 1D–F.

An example of such analysis applied to 12-pulse rectification is shown in FIGS. 1D–F, where the multiphase effect is obtained by using the 30-degree shift between voltages in delta and wye connections of the three-phase transformer, as shown in FIG. 1A. For instance, FIG. 1E illustrates the reflected primary side currents from each winding (i.e., delta and wye) as reflected back to the primary delta winding. The summation of the reflected secondary windings results in the total current Is1 as illustrated. FIG. 1F illustrates the secondary side currents that are the basis for the reflected primary side currents of FIG. 1E. These aspects of static DC power supplies and full wave rectification are well known in the art and will not be described further herein.

FIG. 2 illustrates typical waveforms of the primary side voltage 21 and current 22. The distortion in the primary side waveforms is a result of the switching and harmonics generated in the DC supply. Those skilled in the art will appreciate that there is generally and inverse relationship between the number of phases (pulses) on the secondary side and the total harmonic distortion (THD) on the primary side. Additional components such as passive filters, capacitors, chokes and the like can be used to further reduce the THD on the primary side.

Twelve-pulse rectification, commonly used in the aircraft and aerospace systems, generate total harmonic distortion in the range of 7% to 12%. The level of total harmonic distortion can vary from system to system due to the action of passive filtering usually added to enhance the performance of the power system.

In modern aircraft with electric power systems operating over a wide frequency range, it is desirable to keep the level of total harmonic distortion below 5% level. The level of total harmonic distortion as reflected on the primary side can be important because it represents a source of noise on the AC power source. This noise can effect sensitive equipment including causing the equipment to malfunction. An 18-pulse method can eliminate or reduce these effects by reducing the noise level on the AC power source.

FIGS. 3A–F illustrate an 18-pulse system wherein the figures correspond to the FIGS. 1A–F of the 12-pulse system to show the differences between the systems. Therefore, these figures are not described in detail except to illustrate comparisons between the 12-pulse and 18-pulse systems. The 18-pulse system is comprised of three 6-pulse systems phase shifted 40 electrical degrees. In contrast the 12 pulse system is comprised of two 6-pulse systems phase shifted 30 electrical degrees. In the 18-pulse system the voltages are balanced and an interphase inductor is not required, as is used in the 12-pulse system. Additionally, as shown in FIG. 3D the ripple voltage generated in the 18-pulse system is significantly less than the 12-pulse system of FIG. 1D. Correspondingly, the total primary side current Is1 of FIG. 3E has more steps of less magnitude than the primary side current Is1 of FIG. 1E. Consequently, the waveform of Is1 is less distorted in the 18-pulse system and less total harmonic distortion is generated on the primary side. Other well known differences between the 18-pulse and 12-pulse systems will be apparent to those skilled in the art and for brevity will not be described further herein.

In applications where the isolation between the AC power source and DC output is not required, a significant reduction in weight, volume (i.e., size), and cost can be achieved through the use of multiphase autotransformers instead of fully isolated transformers. In aerospace systems, where the component weight is one of the important design objectives, the use of autotransformers enables a new level of performance with respect to size, cost and weight.

One example of a multiphase rectification using an autotransformer is disclosed in U.S. Pat. No. 6,101,113. This patent describes a 12-pulse converter system with a 3-phase autotransformer with 4 windings per phase. The autotransformer is used to power two 6-pulse converter bridges connected in parallel with a large dc filter capacitor. The transformer rating is typically about 40% of the DC kW load. The voltage ratio is typically 1:1 so that the average dc output of a multi-pulse converter is generally the same as that of a conventional 3-phase bridge rectifier without transformer. A small single-phase transformer is used to block unwanted circulating currents between the two 6-pulse converters. Where necessary to further reduce high frequency harmonic currents, a 3-phase ac line reactor may be connected in series with the source of AC power. Where a smaller degree of harmonic reduction is acceptable, only 3 windings per phase are required on the transformer and raising the zero-sequence impedance of the autotransformer by means of an additional magnetic path eliminates the small single-phase transformer. This method can be also be applied to 18-pulse operation. However, the system requires the use of two zero-sequence blocking transformer (ZSBTs). Further, an additional impedance in one line is needed to ensure balance of the three, 3-phase bridge converter currents. Additionally, the arrangement of the windings is such that the input voltage is stepped up in a 1:1 design thus requiring additional turns for this application when compared to a 1:1 design that does not require a voltage step up.

SUMMARY OF THE INVENTION

The present invention utilizes an 18-pulse rectification system with autotransformer optimized for the lowest weight to overcome above-noted the prior art characteristics. The present invention provides an electrical power conversion system and a wye-connected autotransformer comprising three sections each spaced 120° electrically apart, wherein each section comprises a main winding and a pair of phase shift windings. The main winding has a neutral end and source end, wherein the neutral end is connected to a floating neutral point and wherein the source end is connected to one phase of a three-phase power source. The pair of phase shift windings each comprise a second winding and a third winding connected in series, wherein one end of the second and third windings is connected to the source end of the main winding and wherein an other end the second and third windings is a phase of the wye-connected autotransformer that is phase shifted +/−40° electrically from the source end. Each main winding has a same first number of turns, each second winding has a same second number of turns, and each third a same third number of turns. A ratio between the first, second and third number of turns is about 1:0.137:0.605, respectively.

In another embodiment, a wye-connected autotransformer according to the present invention comprises three sections each spaced 120° electrically apart, wherein each section comprises: a main winding having a neutral end, a central tap and an output end, wherein the neutral end is connected to a floating neutral point, wherein the central tap is connected to one phase of a three-phase power source, and wherein the output end is a phase of the wye-connected autotransformer; and a pair of phase shift windings, wherein one end of each phase shift winding is connected to the central tap of the main winding and wherein an other end of each phase shift winding is a phase of the wye-connected autotransformer that is phase shifted +/−40° electrically from the output end, wherein each main winding has a same first number and a same second number of turns as determined by the central tap and each phase shift winding has a same third number of turns.

BRIEF DESCRIPTION OF THE DRAWINGS

Other aspects and advantages of the present invention will become apparent upon reading the following detailed description and upon reference to the drawings, in which:

FIGS. 1A–F illustrate an idealized 12-pulse rectification with two 6-pulse bridges and interphase inductor;

FIGS. 3A–F illustrate an idealized 18-pulse rectification scheme;

FIG. 5A illustrates configuration of an autotransformer according to the present invention;

FIG. 5B illustrates a phasor diagram of the autotransformer according to the present invention;

FIG. 5C illustrates waveforms of an 18-pulse power system according to the present invention;

FIGS. 6A–C illustrate various configurations of autotransformers for 18 pulse rectification according to the present invention;

FIG. 7 illustrates a regulated TRU with an 18-pulse front end according to the present invention;

FIG. 8A illustrates a phasor diagram of a wye-connected autotransformer in a boosting configuration according to the present invention; and FIG. 8B illustrates a configuration for a boosting ratio of 2.5.

DETAILED DESCRIPTION

Aspects of the invention are disclosed in the accompanying description. Alternate embodiments may be devised without departing from the spirit or the scope of the invention. Additionally, well-known elements of the invention will not be described in detail so as not to obscure the relevant details of the present invention.

Figure 4:
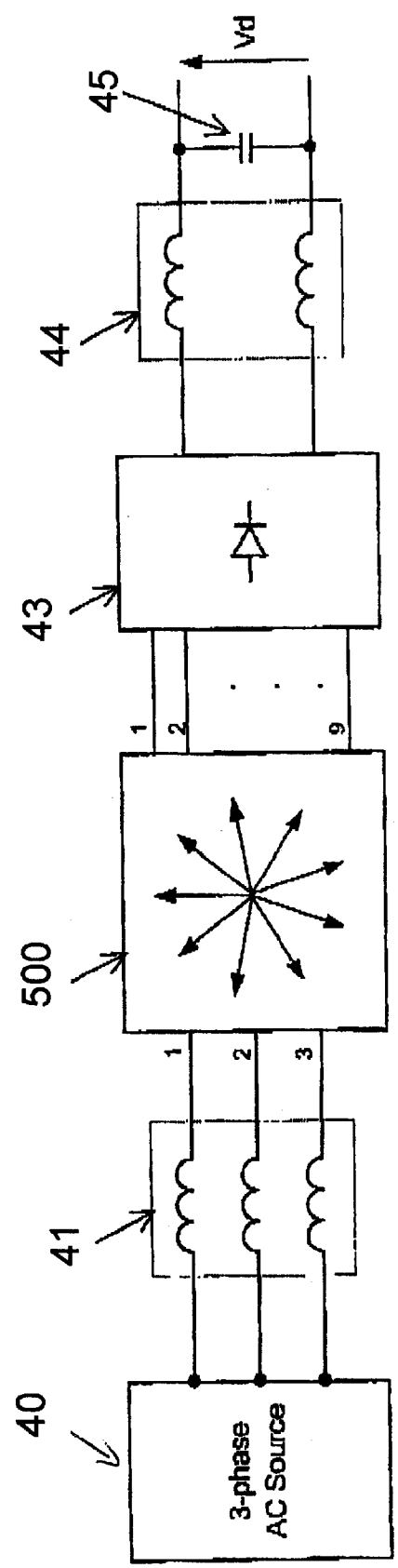
FIG. 4 illustrates an 18-pulse rectification system.

FIG. 4 illustrates a multiphase autotransformer 500 supplied from a three-phase AC source 40 through a three-phase line reactor 41 and connected to an array of rectifying devices 43. Those skilled in the art will appreciate that the rectifying devices can be diodes, transistors, field effect transistors (FETs), metal oxide semiconductor FETs (MOSFETs), silicon controlled rectifiers (SCRs), insulated gate bipolar transistors (IGBTs), hybrid devices (e.g., combinations of these devices and related circuitry), and the like. The output of the rectifying array 43 is additionally filtered in a DC filter circuit comprising an inductive element 44 and capacitor 45. Those skilled in the art will appreciate that the 18-pulse system of the present invention can be used in a variety of conventional arrangements, such as shown in FIG. 4.

FIG. 5A illustrates the basic "wing" configuration of according to one embodiment of a wye-connected autotransformer 500 of the present invention. The wye-connected autotransformer 500 has three sections 501 each spaced 120° electrically apart. Each section 501 includes a main winding 510 having a neutral end and source end 514, wherein the neutral end is connected to a floating neutral point 502 and wherein the source end 514 is connected to one phase 1, 2, 3, of a three-phase power source. Each section also includes a pair of phase shift windings 540. Each phase shift winding 540 comprises a second 520 and a third winding 530 connected in series. One end of the second and third windings is connected to the source end 514 of the main winding 510. The other end the second 520 and third 530 windings is a phase 4, 5, 6, 7, 8, 9 of the wye-connected autotransformer 500 that is phase shifted +/−40° electrically from the source end 514. Each main winding 510 has a same first number of turns n1, each second winding 520 has a same second number of turns, and each third winding 530 has a same third number of turns n3. The ratio between the first n1, second n2 and third n3 number of turns is about 1:0.137:0.605, respectively. Those skilled in the art will appreciate that the ratios of windings are ideal and that these ratios will vary slightly based on the actual number of turns used in winding the transformer.

To simplify the illustration of the winding configuration, individual windings are represented by a straight line with designation n1, n2 or n3, representing the number of turns. All windings coupled with phase 1 of the three-phase supply system are oriented vertically. All windings coupled with phase 2 are oriented 120° clockwise with respect to the windings of phase 1. All windings coupled with phase 3 are oriented 240° clockwise with respect to the windings of phase 1. Individual windings are connected to produce voltages shown in the phasor diagram of FIG. 5B. Turn ratios of n1:n2:n3=1:0.137:0.605, and an autotransformer with winding arrangement of FIG. 5A will form a symmetrical nine-phase AC source at nodes 1–9, when supplied from a symmetrical 3-phase source connected to nodes 1, 2, and 3, respectively. In practical applications, the winding ratios are selected as close as possible to the ideal ratios provided above (e.g., n1:n2:n3=66:9:40, as described below in relation to table 1). The individual phasors of such a nine-phase source will have a magnitude, approximately equal to the magnitude of the supply source, and the phase displacement between the phasors will be approximately 40°.

Using a nine-phase source in connection with an array comprising nine pairs of rectifying devices, as shown in FIG. 3C, the rectified DC voltage will show characteristics typical of 18-pulse rectification. Consequently, the supply current forms a nine-level stepping function as shown in FIG. 3E. In an ideal case, the DC load current is constant and the low order harmonics of the supply current (i.e., 5th, 7th, 11th, 13th and 15th) will be cancelled and the current harmonic spectrum will show only the higher-order harmonics (i.e., 17th, 19th, etc.). However, those skilled in the art will appreciate that some residual amount of low-order harmonics will be present due to circuit imperfections resulting from non-ideal turns ratios, parametric asymmetry of the circuit components and like factors. In order to mitigate such effects and further reduce the harmonic content, a Line Reactor 41 and a simple DC Filter 44, 45 can be used, as shown in FIG. 4.

Figure 2:
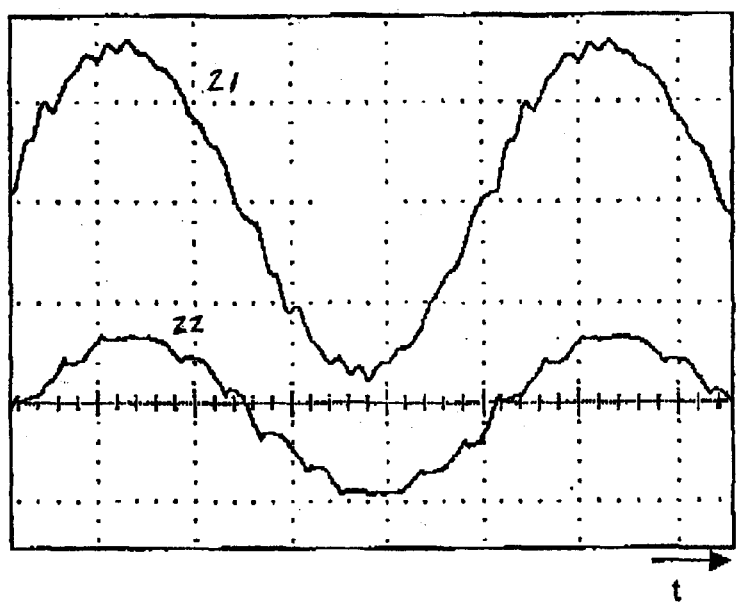
FIG. 2 illustrates typical waveforms of a 12-pulse circuit with two 6-pulse bridges and interphase inductor.

FIG. 5C illustrates typical waveforms of the primary side voltage 51 and current 52 for an 18-pulse system according to the present invention. As previously noted, the distortion in the primary side waveforms is a result of the switching and harmonics generated in the DC supply. Those skilled in the art will appreciate that when compared to the 12-pulse waveform of FIG. 2 that the total harmonic distortion (THD) on the primary side is significantly reduced. This is visually indicated by the distortion of the waveform as seen in the figures. Additionally, the actual THD of the current was measured as 3.2%, which is below the desired 5% limit for aircraft and aerospace power systems.

Several variations of the basic "wing" autotransformer can be used to obtain the same 18-pulse performance. Graphical representations of the basic and variant configurations are shown in FIGS. 6A–C. FIG. 6A illustrates a basic "wing" configuration as shown previously in FIG. 5A. FIG. 6B illustrates an "asymmetrical" configuration. FIG. 6C illustrates a mixed configuration of the basic and asymmetrical configurations. Those skilled in the art appreciate that the specific sequence of the windings is not important as long as the winding ratios and phase relationships are maintained.

The above description and analysis is based on three-phase transformers wound on three-leg E-type cores. In the case where three single-phase transformers are used, additional tertiary windings connected in delta must be included, according to standard practices governing the use of single-phase transformers in three-phase systems, which is well known in the art.

The invention can be used as a front end of regulated transformer rectifier units (TRUs), motor drives, and other equipment supplied from three-phase AC sources. FIG. 7 illustrates an exemplary embodiment of an 18-pulse rectification system according to the present invention functioning as the front end of a regulated TRU 700. A three-phase line reactor 710 is connected in series between the three-phase power source 701 and the wye-connected autotransformer 720. A plurality of diode bridges 730 is directly connected to the phases 1–9 of the wye-connected autotransformer 720 so as to convert AC power from the three-phase power source 701 into a DC output 735. A snubber network 740 is connected in parallel to the DC output 735. A DC filter circuit includes two inductors 750 and a capacitor 755. Each inductor 750 is connected in series to each leg of the DC output 735. The capacitor 755 is connected in parallel to a DC bus 760 that is connected to output ends of each inductor 750. The DC bus 760 supplies a DC/DC converter 770 that provides power conditioning and isolation to down stream devices. Alternatively, those skilled in the art will appreciate that the DC bus 760 can directly supply DC power to various load devices.

Operating characteristics of the front end circuit 700 are as follows in table 1:

TABLE 1

| Input Power Source: | 200 V line-line, 360 Hz to 800 Hz |
|---|---|
| Input Line Current: | 29 A |
| Input Power Factor: | 0.975 (400 Hz) |
| Total Current Harmonic Distortion | <4% |
| DC Bus Power: | Vd = 302 V, Id = 31 A |

The main components used in front end circuit 700 have the following characteristics: Line Reactor, 3-phase L=150 uH; Autotransformer, winding turns, n1:n2:n3=66:9:40; DC Filter Chokes: L=2×36 uH; and DC Bus Capacitor: C=105 uF.

In general, wye-connected multiphase transformers have a structure easily adaptable to voltage adjustments by using taps on the main windings. However, the same technique used in delta-connected transformers produces an additional phase shift that needs to be compensated, as will be appreciated by those skilled in the art The magnitude invariant wye-connected autotransformer of the present invention has lower weight than the prior solutions, while preserving the same functionality in the 18-pulse rectification scheme. An analysis of the winding arrangement of an autotransformer according to the present invention and prior autotransformers has been performed. The winding arrangement of an autotransformer according to the present invention requires lower number of turns, hence less copper, to produce the same phase shifting effects. Quantitative comparison obtained through simulation yields the following results as detailed in Table 2.

TABLE 2

| Parameter | Prior Devices | Present Invention |
|---|---|---|
| DC Power [Watts] | 9316 | 9359 |
| Transformer VA Rating [ΣVA] | 9779 | 8939 |
| ΣVA/DC Power | 1.05 | .96 |

In addition to the above-described advantages of the present invention such as the lower weight and KVA rating of the transformer, the system also provides for more suppression of the residual harmonics using additional components as described above (e.g., as shown in FIG. 7).

FIGS. 8A and 8B illustrate yet another embodiment of the present invention. FIG. 8A illustrates a phasor diagram of a boost configuration according to the present invention. The illustration shows a boost ratio of 2.5. However those skilled in the art will appreciate that the boost ratio can be varied without departing from the scope of the present invention. In this embodiment the three-phase AC voltage source Vs1, Vs2, Vs3 is connected to a central tap point in each respective leg of the transformer, as illustrated in FIG. 8B.

Referring to FIG. 8B, the winding configuration of a wye-connected autotransformer 800 according an embodiment of the present invention is shown. The autotransformer 800 includes three sections 801 each spaced 120° electrically apart. Each section comprises a main winding 810 and a pair of phase shift windings 820. To simplify the illustration of the invention only the reference numbers of one section will be described below. However, those skilled in the art will appreciate that the configuration of each section is identical and designed to yield the appropriate phase shifted outputs.

Each main winding has a neutral end, a central tap 811 and an output end 1. The neutral end is connected to a floating neutral point 801. The central tap 811 is connected to one phase of a three-phase power source Vs1, and the output end 1 is a phase of the wye-connected autotransformer 800. The central tap 811 of the main winding 810 divides the main winding 810 into a first turns n1a and a second turns n1b. Thus, the central tap determines the boost ratio as determined by the ratio of the first turns n1a of the main winding to the total turns of the main winding (i.e., n1a+n1b). As illustrated in the present example n1a=0.4 and n1b=0.6, thus the main winding=1 and the boost ratio=1/0.4=2.5. Those skilled in the art will appreciate that this ratio can be altered either by having various taps on the main winding or by forming the main winding out of separate coils as is well known in the art.

The pair of phase shift windings 820 each have one end connected to the central tap 811 of the main winding 810. The other end of each phase shift winding 9, 4 is a phase of the wye-connected autotransformer that is phase shifted +/−40° electrically from the output end 1.

Each main each main winding has the same first number n1a and the same second number n1b of turns as determined by the central tap and each phase shift winding has a same third number n2 of turns. The wye-connected autotransformer as illustrated in FIG. 8B has a ratio between the first, second and third number of turns of about 0.4:0.6:0.74, respectively. Those skilled in the art-will appreciate that these ratios are determined by the desired boost ratio of the transformer. The boost ratio is determined from the difference between the AC source voltage and the desired output voltage. For example, if the AC source voltage is 100 volts and the desired output voltage of the transformer is 250 volts then the boost ratio is 2.5.

The foregoing merely illustrates the principles of the invention. It will be appreciated that those skilled in the art will be able to devise various arrangements of the present invention. For example, a similar arrangement, using an autotransformer with different turn ratios can be used in 12-pulse rectification systems as will be appreciated by those skilled in the art. Therefore, the scope of the invention is not limited by the foregoing description but is defined solely by the appended claims.

What is claimed is:

1. An electrical power conversion system comprising:
 a wye-connected autotransformer comprising three sections each spaced 120° electrically apart, wherein each section comprises:
  a main winding having a neutral end and source end, wherein the neutral end is connected to a floating neutral point and wherein the source end is connected to one phase of a three-phase power source; and
  a pair of phase shift windings, wherein each phase shift winding comprises a second winding and a third winding connected in series, wherein one end of the second and third windings is connected to the source end of the main winding and wherein an other end of the second and third windings is a phase of the wye-connected autotransformer that is phase shifted +/−40° electrically from the source end,
  wherein each main winding has a same first number of turns, each second winding has a same second number of turns, and each third winding has a same third number of turns, and wherein a ratio between the first, second and third number of turns is about 1:0.137:0.605, respectively.

2. The electrical power conversion system of claim 1, further comprising:
 an array of rectifying devices directly connected to each phase of the wye-connected autotransformer so as to convert AC power from the three-phase power source into DC power.

3. The electrical power conversion system of claim 2, wherein each rectifying device is at least one of a diode, transistor, field effect transistor (FET), metal oxide semiconductor FET (MOSFET), silicon controlled rectifier (SCR), insulated gate bipolar transistor (IGBT) and hybrid device.

4. The electrical power conversion system of claim 2, further comprising:
 a three-phase line reactor that is connected in series between the three-phase power source and the wye-connected autotransformer; and
 a DC filter circuit comprising an inductive element and capacitor connected at an output of the array of rectifying devices.

5. The electrical power conversion system of claim 1, wherein the wye-connected autotransformer is arranged in a wing configuration.

6. The electrical power conversion system of claim 1, wherein the wye-connected autotransformer is arranged in an asymmetrical configuration.

7. The electrical power conversion system of claim 1, wherein the wye-connected autotransformer is arranged in a mixed configuration.

8. The electrical power conversion system of claim 1, wherein the wye-connected autotransformer is part of a front end of a regulated transformer rectifier unit.

9. The electrical power conversion system of claim 1, wherein the autotransformer further comprises a three-leg E-type core.

10. The electrical power conversion system of claim 1, further comprising:
 a three-phase line reactor that is connected in series between the three-phase power source and the wye-connected autotransformer;
 a plurality of diode bridges directly connected to the phases of the wye-connected autotransformer so as to convert AC power from the three-phase power source into a DC output;

a snubber network connected in parallel to the DC output; and a DC filter circuit comprising two inductors, each inductor connected in series to each leg of the DC output and capacitor connected in parallel to a DC bus that is connected to output ends of each inductor.

11. A wye-connected autotransformer comprising:

three sections each spaced 120° electrically apart, wherein each section comprises:

a main winding having a neutral end and source end, wherein the neutral end is connected to a floating neutral point and wherein the source end is connected to one phase of a three-phase power source; and a pair of phase shift windings, wherein each phase shift winding comprises a second winding and a third winding connected in series, wherein one end of the second and third windings is connected to the source end of the main winding and wherein an other end of the second and third windings is a phase of the wye-connected autotransformer that is phase shifted +/−40° electrically from the source end, wherein each main winding has a same first number of turns, each second winding has a same second number of turns, and each third winding has a same third number of turns, and wherein a ratio between the first, second and third number of turns is about 1:0.137:0.605, respectively.

12. The autotransformer of claim 11, wherein the wye-connected autotransformer is arranged in a wing configuration.

13. The autotransformer of claim 11, wherein the wye-connected autotransformer is arranged in an asymmetrical configuration.

14. The autotransformer of claim 11, wherein the wye-connected autotransformer is arranged in a mixed configuration.

15. The autotransformer of claim 11, further comprising a three-leg E-type core.

16. A wye-connected autotransformer comprising:

three sections each spaced 120° electrically apart, wherein each section comprises:

a main winding having a neutral end, a central tap and an output end, wherein the neutral end is connected to a floating neutral point, wherein the central tap is connected to one phase of a three-phase power source, and wherein the output end is a phase of the wye-connected autotransformer; and a pair of phase shift windings, wherein one end of each phase shift winding is connected to the central tap of the main winding, an other end of each phase shift winding is a phase of the wye-connected autotransformer that is phase shifted +/−40° electrically from the output end, and a voltage boost occurs from said one end of each phase shift winding to said an other end of each phase shift winding, wherein each main winding has a same first number and a same second number of turns as determined by the central tap and each phase shift winding has a same third number of turns.

17. The wye-connected autotransformer of claim 16, wherein a ratio between the first, second and third number of turns is about 0.4:0.6:0.74, respectively, for a 2.5 boost ratio.

18. The wye-connected autotransformer of claim 16, wherein each main winding comprises a first winding and a second winding connected in series at the central tap.

19. The wye-connected autotransformer of claim 16, further comprising a three-leg E-type core.

* * * * *